Figure 1:
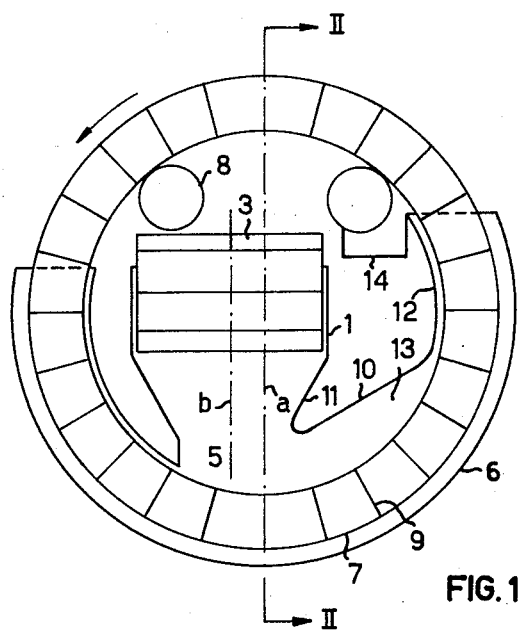

Dec. 15, 1959    J. N. J. LEEMAN    2,917,172
APPARATUS FOR SEPARATING MIXTURES INTO A FRACTION CONTAINING
PARTICLES OF LOW SPECIFIC GRAVITY AND ANOTHER FRACTION
CONTAINING PARTICLES OF HIGH SPECIFIC GRAVITY
Filed March 18, 1957

INVENTOR
JAN N. J. LEEMAN

BY
Cushman, Darby & Cushman
ATTORNEYS

United States Patent Office 2,917,172
Patented Dec. 15, 1959

2,917,172

APPARATUS FOR SEPARATING MIXTURES INTO A FRACTION CONTAINING PARTICLES OF LOW SPECIFIC GRAVITY AND ANOTHER FRACTION CONTAINING PARTICLES OF HIGH SPECIFIC GRAVITY

Jan N. J. Leeman, Brunssum, Netherlands, assignor to Stamicarbon N.V., Heerlen, Netherlands Application March 18, 1957, Serial No. 646,895

Claims priority, application Netherlands March 21, 1956

1 Claim. (Cl. 209—172.5)

The present invention relates to an apparatus for separating mixtures of solid particles and, more particularly, to an apparatus for separating mixtures into a fraction containing particles of low specific gravity and another fraction containing particles of high specific gravity.

In the float and sink method of separation of mixtures, a tank filled with a heavy separating medium, such as magnetite in water, is provided for receiving the mixture to be separated. If a mixtuer, such as coal and shale is to be separated, the coal will float on the surface of the separating medium, whereas, the shale will settle to the bottom of the tank. In prior apparatus, the sink particles were raised and discharged from the tank by means of a rotating ring structure encircling the wash tank and passing through an arcuate-shaped housing in open communication with the bottom of the tank, said ring structure including a plurality of blades adapted to remove particles settling into the housing from said tank. In this known construction, sink particles located near the edge of the bottom outlet of the tank oftentimes are jammed between the housing and the inner edge of the blades, causing damage to the blades and an increase of the power necessary to rotate the ring structure.

An object of the present invention is to provide a float and sink type of separating apparatus utilizing a ring structure provided with blades, the ring structure encircling the separation tank and passing through an arcuate housing in open communication with the bottom of the separating tank, in which the power necessary for driving the ring structure is decreased.

Another object of the present invention is to provide a float and sink type separating apparatus utilizing a ring structure encircling the separating tank and passing through a housing in open communication with the tank, in which damage of the blades by sink particles jammed between the blades of the ring structure and the inner wall of the housing is prevented.

Still another object of the present invention is to provide a float and sink type of apparatus utilizing a ring structure provided with blades, the ring structure encircling the separating tank and passing through an arcuate housing in open communication with the bottom of the tank, in which the sink particles are permitted a longer period of time to sink past the edges of the housing prior to the blades of the ring structure coming into close proximity with the side walls of the housing.

Figure 2:
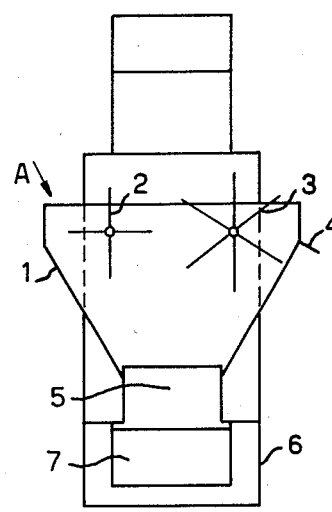

These and other objects and advantages of the present invention will appear more fully in the following specification, claim and drawing, in which:

Figure 1 is a diagrammatic sectional view of the apparatus in a vertical plane parallel with the ring structure, and Figure 2 is a diagrammatic sectional view taken on the line II—II of Figure 1.

Referring specifically to the drawings, wherein like reference numerals or characters represent like or similar parts, a deep wash box or tank 1 is provided for receiving a heavy liquid separating medium, such as a magnetite suspension. The material which is to be separated is fed to the tank 1 at A. If the material to be separated is a mixture, such as shale and coal, the coal will float on the heavy liquid separating medium and a pair of paddle wheels 2 and 3, provided adjacent the surface of the liquid, are adapted to move the coal particles toward an overflow chute 4 where they are discharged from the apparatus. The heavy shale particles settle in the separating medium in the tank 1 and pass through an outlet or bottom 5 of the tank into an arcuate-shaped housing 6. It will be noted from Figures 1 and 2 that the bottom walls 11 of the tank 1 converge toward each other, their lower ends defining the outlet 5.

A ring structure 7, having a plurality of radially extending blades, encircles the tank 1 and extends through the arcuate housing 6. A pair of rollers 8, suitably carried above the tank and the separating medium within the tank, are adapted to support and drive the ring structure 7 in the direction of the arrow shown in Figure 1. Any suitable drive mechanism may be used to rotate the rollers 8.

Arcuate-shaped housing 6 is provided with end portions which terminate above the level of the separating medium in the tank 1. The end portions of housing 6 have a cross-sectional area sufficient to permit the blades 9 of ring structure 7 to pass therethrough in close proximity with the walls of the housing. The intermediate portion of housing 6, which is in open communication with the outlet or bottom 5 of the tank, is enlarged, as indicated at 13, so as to permit a longer period of time for the shale particles to settle in the separating medium before the blades 9 of the rotating ring structure pass in close proximity with the walls of the housing. In more detail, the bottom wall 11 of the tank 1, which is on the side of the tank from which the sink particles are raised, terminates at a substantial distance above the inner edges of the blades 9 traveling beneath the tank, as shown in Figure 1. A top wall 10 of the housing 6 extends upwardly from the bottom or lower end of the wall 11 of the tank to a point at a higher level than the bottom 5 so that the area of the housing 6 at this position is enlarged, as indicated at 13. The wall 10, which slopes upwardly from the bottom of tank 1, connects with a wall 12 of the housing which is in close proximity to the blades 9 of the ring structure 7 so that the blades 9 do not travel in close proximity with the housing after they reach a point where they are beneath the outlet 5 of tank 1, until such time that they have traveled to a position above the outlet of the tank. By providing the enlarged portion 13 of the housing 6 on the exit side of the outlet 5, the slowly sinking particles of shale will have time to settle between the blades 9 of the blade structure 7 before the blades enter into close proximity with the housing 6 at the discharge end.

Shale particles dropping between the blades 9 are picked up by the blades and as the blades pass out of the housing 6 the shale particles slide inwardly of the blades against the wall or section 12 of the housing 6 until the blades of the ring structure 7 reach a specified height above the level of the center of the ring structure. The shale particles are then discharged inwardly from the blades 9 into a chute 14, through which they are conducted away from the apparatus.

Since it is necessary to provide the chute 14 within the ring structure 7 and, further, since it is desirable to have the enlarged portion 13 of housing 6 as large as possible, the tank 1 is placed eccentrically with respect to the ring structure 7, as is shown in Figure 1. By having the tank 1 eccentrically mounted with respect to the ring structure 7, the vertical center line $a$ of the ring structure lies between the vertical center line $b$ of the tank and the enlarged portion 13 of the housing 6.

Although the enlarged portion 13 of the housing 6 is shown as having the wall 10 sloping upwardly away from the lower end of the wall 11 of tank 1, it is of course within the scope of the invention to have the wall 10 extending horizontally or sloping downwardly away from the bottom of the wall 11 of the tank. In either of the latter instances, the time for the sink particles to settle is reduced but if the enlarged portion of the housing is of sufficient size, the particles will still have sufficient time to settle between the blades 9 before the blades enter the restricted portion of the housing.

The terminology used in this specification is for the purpose of description and not limitation, the scope of the invention being defined in the claim.

I claim:

An apparatus for separating mixtures of particles differing in specific gravity into a fraction containing floating particles of low specific gravity and another fraction containing settled sink particles of high specific gravity comprising: a deep wash tank for receiving a heavy separating medium, means for feeding a mixture to be separated into the tank, means for removing floating particles from the surface of the separating medium in said tank, said tank having an outlet in its bottom for discharging settled sink particles therethrough, an arcuate-shaped housing communicating intermediate its ends with the outlet of said tank, a rotating ring structure encircling said tank and passing through said housing, means to rotate said ring structure, said ring structure being eccentrically positioned with respect to said tank and having its axis of rotation spaced horizontally from a vertical center line through said tank thereby providing a larger space on one side of said tank than on the other side of said tank, said ring structure including a plurality of blades for conveying sink particles settling through the outlet in said tank, chute means positioned in said larger space between said tank and said rotating ring structure for receiving sink particles discharged from inner edges of said blades as said blades pass out of said housing, said housing having its wall in each of its end portions in close proximity to the blades of said ring structure and having a portion of its wall connected to the wall of said tank adjacent said outlet spaced from the inner edges of said blades and extending in the direction of rotation of said ring structure upwardly and away from the outlet to a point at a higher level than the bottom of said tank so as to define an enlarged section in said housing on the up-take side of said ring structure whereby sink particles settling through said outlet of said tank have more time to completely settle between the blades of said ring structure.

References Cited in the file of this patent

UNITED STATES PATENTS

| | | |
|---|---|---|
| 2,521,152 | Davis | Sept. 5, 1950 |
| 2,733,811 | Murry | Feb. 7, 1956 |
| 2,760,633 | Davis | Aug. 28, 1956 |

FOREIGN PATENTS

| | | |
|---|---|---|
| 667,754 | Great Britain | Mar. 5, 1952 |